(12) United States Patent
Lin et al.

(10) Patent No.: US 6,666,076 B2
(45) Date of Patent: Dec. 23, 2003

(54) GLIDE HEAD WITH OUTER ACTIVE RAIL

(75) Inventors: Zuxuan Lin, Shakopee, MN (US); William A. Rehm, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/008,954

(22) Filed: Dec. 6, 2001

(65) Prior Publication Data

US 2002/0069695 A1 Jun. 13, 2002

Related U.S. Application Data

(60) Provisional application No. 60/254,259, filed on Dec. 8, 2000.

(51) Int. Cl.[7] .............................. G01B 5/28; G01B 5/127
(52) U.S. Cl. ................... 73/105; 29/603.07; 29/603.12; 360/234.3; 360/235.4
(58) Field of Search ................ 73/104, 105; 29/603.07, 29/603.12; 360/234.3, 235.4, 235.8, 235.9, 236.6, 236.7

(56) References Cited

U.S. PATENT DOCUMENTS

| | | | |
|---|---|---|---|
| 5,774,304 A | 6/1998 | Crane et al. | |
| 5,817,931 A | 10/1998 | Boutaghou | 73/105 |
| 5,939,624 A | 8/1999 | Smith, Jr. | |
| 6,003,364 A | 12/1999 | Yao et al. | 73/105 |
| 6,021,666 A | 2/2000 | Yao et al. | |
| 6,046,871 A | 4/2000 | Schaenzer et al. | |
| 6,112,401 A | 9/2000 | Smith, Jr. | |
| 6,112,582 A | 9/2000 | Yao et al. | |
| 6,164,118 A | 12/2000 | Suzuki et al. | |
| 6,216,529 B1 | 4/2001 | Burga et al. | |
| 6,230,380 B1 | 5/2001 | Wang et al. | |
| 6,233,119 B1 | 5/2001 | Burga et al. | 360/236.9 |
| 6,239,951 B1 | 5/2001 | Wang et al. | 360/236.8 |
| 6,360,428 B1 * | 3/2002 | Sundaram et al. | 29/603.12 |

* cited by examiner

Primary Examiner—Daniel S. Larkin
(74) Attorney, Agent, or Firm—Westman, Champlin & Kelly

(57) ABSTRACT

A glide head for detecting asperities on a disc surface is provided. The glide head includes a glide slider which includes a glide slider body that has a leading edge, a trailing edge, and a bottom surface therebetween. The bottom surface is centered along a longitudinal axis that extends between the leading and trailing edges. An inside rail is disposed on the bottom surface on a first side of the longitudinal axis extends from the leading edge to the trailing edge. An outside rail is disposed on the bottom surface on a second side of the longitudinal axis. The outside rail also extends from the leading edge to the trailing edge. The inside and outside rails are substantially equidistant from the longitudinal axis at the bottom surface. The outside rail is positioned lower than the inside rail such that a bottom surface of the outside rail extends further from a point on the longitudinal axis on the trailing edge than does a bottom surface of the inside rail.

3 Claims, 6 Drawing Sheets

GLIDE HEAD WITH OUTER ACTIVE RAIL

CROSS-REFERENCE TO RELATED APPLICATION

This application claims priority to U.S. Provisional Application No. 60/254,259, filed Dec. 8, 2000 and entitled "OUTER RAIL ACTIVE GLIDE HEAD" incorporated herein by reference.

FIELD OF THE INVENTION

The present invention relates to data storage systems. In particular, the present invention relates to glide heads used to detect defects on surfaces of memory discs, such as those used in disc drive data storage systems.

BACKGROUND OF THE INVENTION

In data processing systems, disc drives are often used as direct access storage devices. In such devices, read/write heads are used to write data on or read data from an adjacently rotating hard or flexible disc. To prevent damage to either the disc or the read/write head, it has been recognized that the surface of the disc should be very flat and free of any bumps or the like which might be contacted by the read/write head. Also, the read/write heads are typically designed to fly over the surface of the rotating disc with a small fly height which is maintained by a film of air (air bearing). During its flight, the head undergoes continuous vibration, pitch, and roll as the topography of the disc changes beneath the head. If the quality of the disc or the read/write head is poor, occasional rubbing or sharp contact may occur between the disc and the read/write head. Such contact may damage the head or the disc, cause loss of valuable data, or all of these.

To ensure that only discs having sufficiently flat surfaces are used in production disc drives, discs are production tested in a quality control procedure prior to installation in a disc drive. Smoothness or flatness testing is performed with a "glide test", which involves flying an air bearing "glide" slider over the disc. The glide slider includes a piezo-electric element or other vibration sensor, which may be bonded on the back of the air bearing slider. The vibration sensor detects "head-disc interferences" or "hits". Each instance of vibration is sensed and recorded for either remedial action or toward rejection of the disc. Vibration may be caused by bumps which decrease the clearance of the slider. If a bump is sufficiently large to create eddy currents and swirls in the air stream which cause the glide slider to vibrate, then the bump is recorded as a defect. The glide slider usually flies at a height lower than the read/write head during normal conditions in order to ensure that any asperity high enough to contact the read/write head will be detected.

Many glide slider designs include an inside rail and an outside rail separated by a central cavity. The rails generate a positive pressure lift force for the slider. Since both the inside rail and outside rail create lift, it is important that as the slider moves laterally across the rotating surface of the disc, both the inside rail and the outside rail remain over the surface of the disc. If the outside rail is moved beyond the outer circumference of the disc, the slider will lose its lift under the outside rail and will roll, causing the slider to contact the disc. Generally, the inside rail and the outside rail fly at the same height from the disc surface. This makes it difficult to determine which rail is detecting defects. Hence, when the slider is at the outer circumference and the active rail (rail that is detecting defects) is unknown, roll could occur causing the slider to contact the disc if the outside rail is moved beyond the outer circumference of the disc.

One glide slider design for testing the outermost portion of the surface of a disc without losing lift is described in U.S. Pat. No. 5,963,396 entitled "GLIDE HEAD WITH AN OUTSIDE ACTIVE RAIL". The glide slider described in U.S. Pat. No. 5,963,396 employs an outside rail that is longer than the inside rail, with the trailing edge of the outside rail extending beyond the trailing edge of the inside rail. When the slider is used for disc surface testing, the trailing edge of the outside rail is closer to the surface of the disc because of the slope of the glide slider's flight. Even though this technique is successful in making the outside rail the active rail, the use of rails of different lengths results in uneven lift during slider flight, thereby requiring additional design adjustments to provide slider flight stability.

The present invention addresses these problems, and offers other advantages over the prior art.

SUMMARY OF THE INVENTION

A glide head for detecting asperities on a disc surface is provided. The glide head includes a glide slider which includes a glide slider body that has a leading edge, a trailing edge, and a bottom surface therebetween. The bottom surface is centered along a longitudinal axis that extends between the leading and trailing edges. An inside rail is disposed on the bottom surface on a first side of the longitudinal axis and extends from the leading edge to the trailing edge. An outside rail is disposed on the bottom surface on a second side of the longitudinal axis. The outside rail extends from the leading edge to the trailing edge. The inside and outside rails are substantially equidistant from the longitudinal axis at the bottom surface. The outside rail is positioned lower than the inside rail such that a bottom surface of the outside rail extends further from a point on the longitudinal axis on the trailing edge than does a bottom surface of the inside rail.

These and various other features as well as advantages which characterize the present invention will be apparent upon reading of the following detailed description and review of the associated drawings.

DETAILED DESCRIPTION

Figure 1:
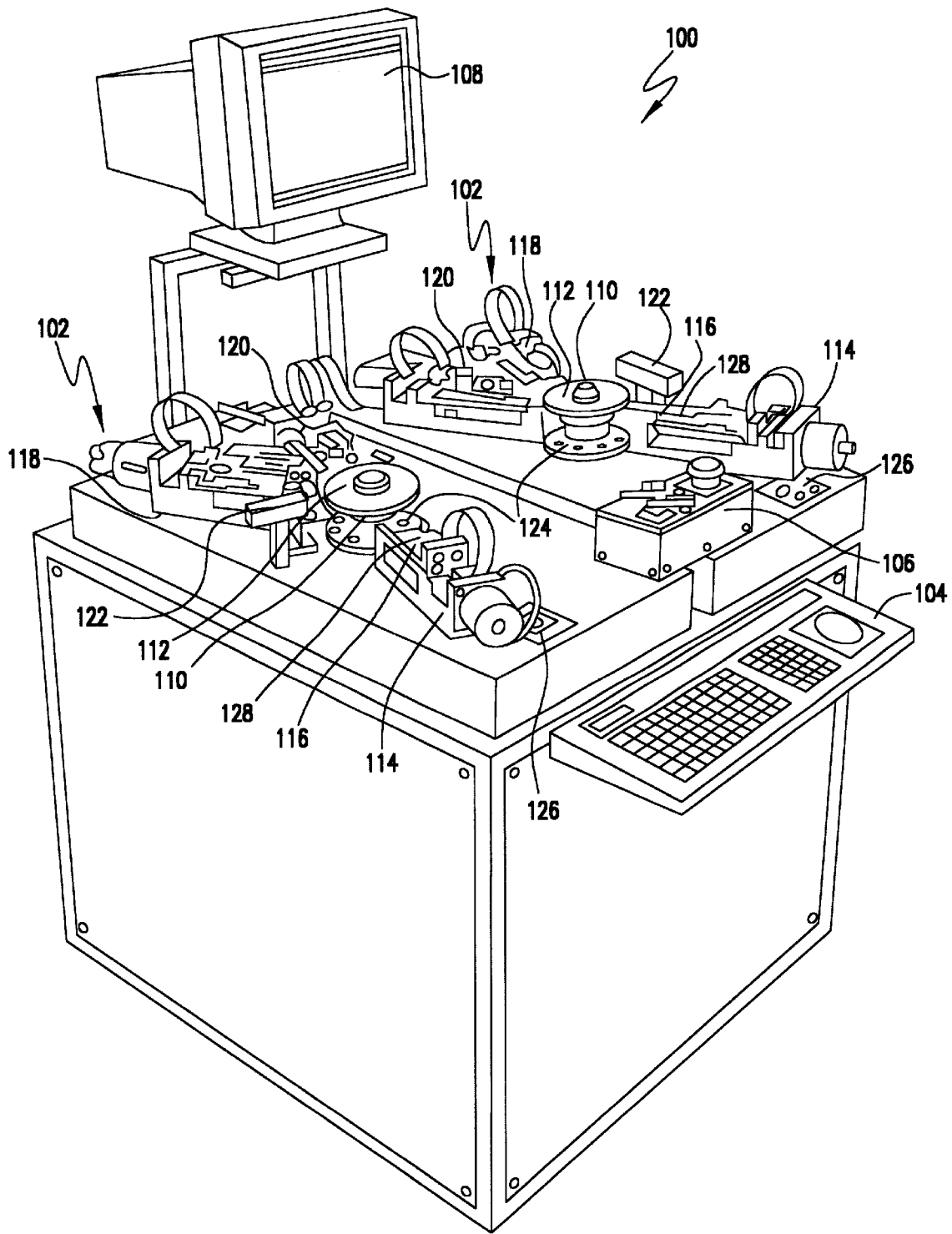
FIG. 1 is a perspective view of a burnish/glide tester.

Referring now to FIG. 1, a test stand 100 of a burnish/glide tester in which the present invention may be used is shown. Test stand 100 includes two test stations 102 which may be simultaneously operated such as on an alternating basis to maximize throughput of discs by a single operator. Test stand 100 includes a keyboard 104 and a control box 106 to control the test being performed, and a display screen 108 to display testing parameters and results. A printer (not shown) may optionally be included to print out test parameters and results.

Each test station 102 includes a spindle 110 on which a disc 112 is mounted for testing. Each spindle 110 includes a motor which rotates the spindle 110 at a selected rotational speed within a range determined by the motor design.

The burnish/glide machinery is positioned around spindle 110 for access to the top and bottom sides of disc 112. For instance, the burnish/glide test machinery may include one or more glide head positioner assemblies 114. Each glide head positioner assembly 114 supports two sliders 116, one for each side of disc 112. The burnish/glide tester preferably provides an index so the circumferential position of disc 112 relative to the glide head positioner assembly 114 and sliders 116 at any given time is known. For instance, spindle 110 may include a circumferential position sensor, or feedback may be taken from disc 112 to monitor circumferential position. The burnish/glide machinery may include other components, such as a burnish head positioner assembly 118, a sweep assembly 120, a bulk erase unit 122, a disc-in-place sensor 124, and associated electronics 126.

Glide head positioner assembly 114 includes a linearly movable actuator arm 128 for each slider 116, with the air bearing slider 116 suspended at the end of each actuator arm 128. Because the slider 116 is linearly actuated, it accesses radially inward and outward on disc 112 in a line (rather than in arc) and maintains a constant skew angle of 0° at all radii. The burnish/glide tester preferably provides an index so the radial position of slider 116 relative to disc 112 at any given time is known. For instance, glide head positioner assembly 114 may include a radial position sensor, or feedback may be taken from disc 112 to monitor radial or track position.

Glide slider 116 includes a vibration sensor 214 schematically shown in FIGS. 2, 3, 4, and 5. Vibration sensor 214 can be of any type known in the art but should be as small as practicable to sense vibration without affecting flying performance of the glide slider 116. For instance, vibration sensor 214 may include a piezo-electric element with electrical leads (not shown), and the electric signal across the leads may vary upon vibration of the piezo-electric element. Alternatively, vibration sensor 214 can be a read head which generates an electrical signal which varies as a function of flying height, i.e., varies as a function of the distance between the glide slider 116 and the underlying disc surface, or a thermal sensor which senses increased heating of the glide slider 116 caused by contact with asperities. Vibration sensor 214 is preferably mounted on the back of slider 116 and toward the trailing edge of slider 116 and adjacent the active rail.

Vibration sensor 214 detects vibrations caused by head-disc interferences or hits. Hits can be head to disc contacts caused by relatively large bumps, and can also be caused by smaller bumps. If a bump is sufficiently large to create eddy currents and swirls in the air stream which cause glide slider 116 to vibrate, then the vibration is detected by vibration sensor 214. Each instance of sensed vibration is recorded as a defect. The glide/burnish tester maps the radial and circumferential location of each defect for either subsequent remedial action or toward rejection of the disc.

Figure 2:
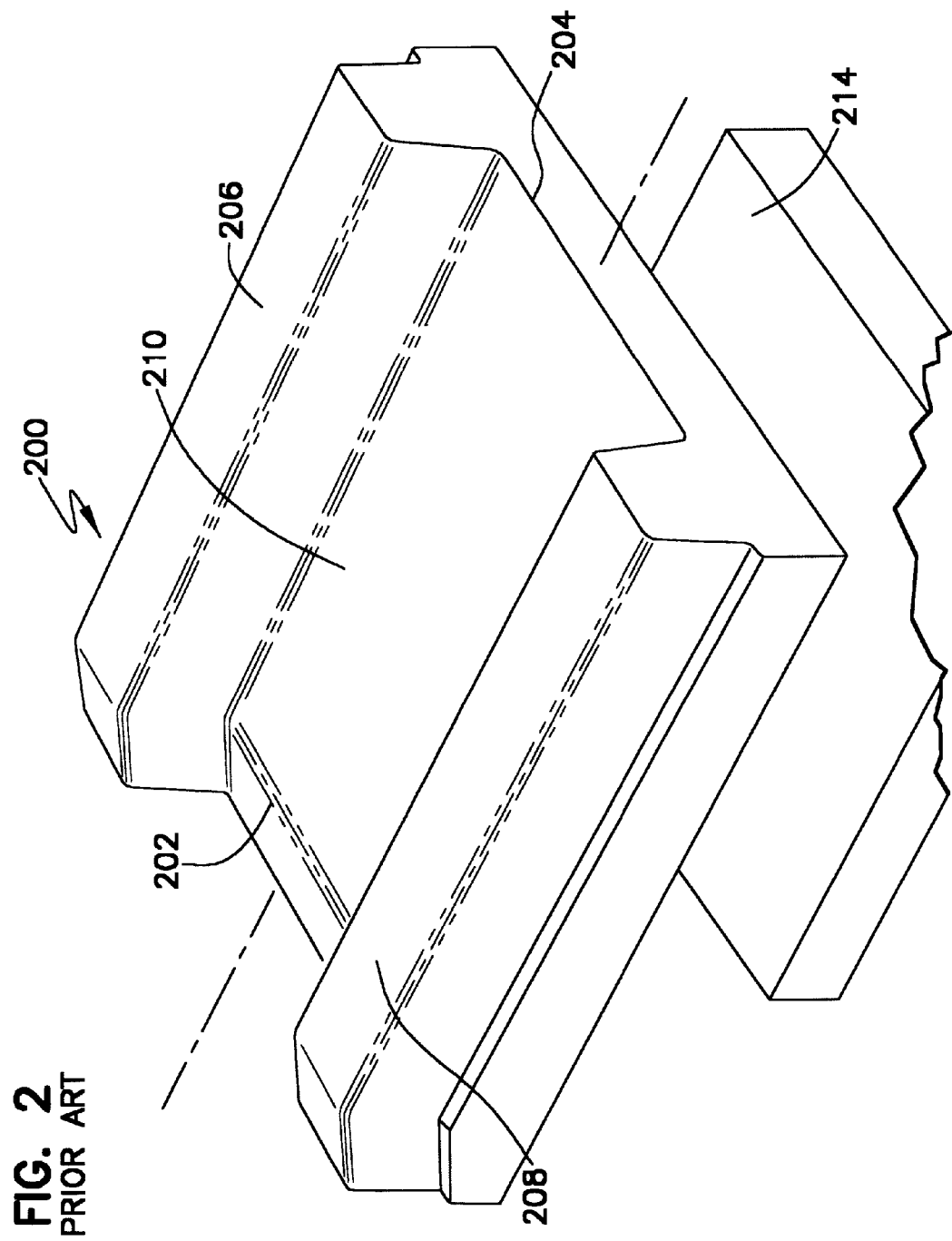
FIG. 2 is a perspective view of a prior art air bearing slider for use in glide testing.

FIG. 2 shows a conventional slider 200 used for glide testing, disc opposing face up. Conventional glide slider 200 generally includes an inside rail 206 and an outside rail 208 that run generally parallel and extend between a leading edge 202 and a trailing edge 204. A central cavity 210 is defined between inside rail 206 and outside rail 208. The dimensions of inside rail 206 and outside rail 208 are usually similar. Glide slider 200 also includes a vibration detection sensor 214. As mentioned above, vibration sensor 214 detects vibrations caused by head-disc interferences or hits.

Inside rail 206 and outside rail 208 generate a positive pressure lift force for slider 200 enabling it to fly over the surface of a disc (such as disc 112 of FIG. 1). As slider 200 moves laterally across the surface of the disc, both inside rail 206 and the outside rail 208 remain over the surface of the disc. If outside rail 208 is moved beyond the outer circumference of the disc, slider 200 will lose its lift under outside rail 208 and will roll, causing slider 200 to contact the disc. Generally, inside rail 206 and outside rail 208 of conventional slider 200 fly at the same height from the disc surface. This makes it difficult to determine whether inside rail 206 or outside rail 208 is detecting defects. Hence, when slider 200 is at the outer circumference of the disc and the active rail is unknown, roll could occur causing slider 200 to contact the disc.

FIGS. 3, 4, 5, and 6 illustrate embodiments of glide heads in accordance with the present invention that can accurately test the outermost portion of the surface of a disc without losing lift. The same reference numerals are used in the figures of embodiments of the present invention to represent the same or similar elements.

Figure 3:
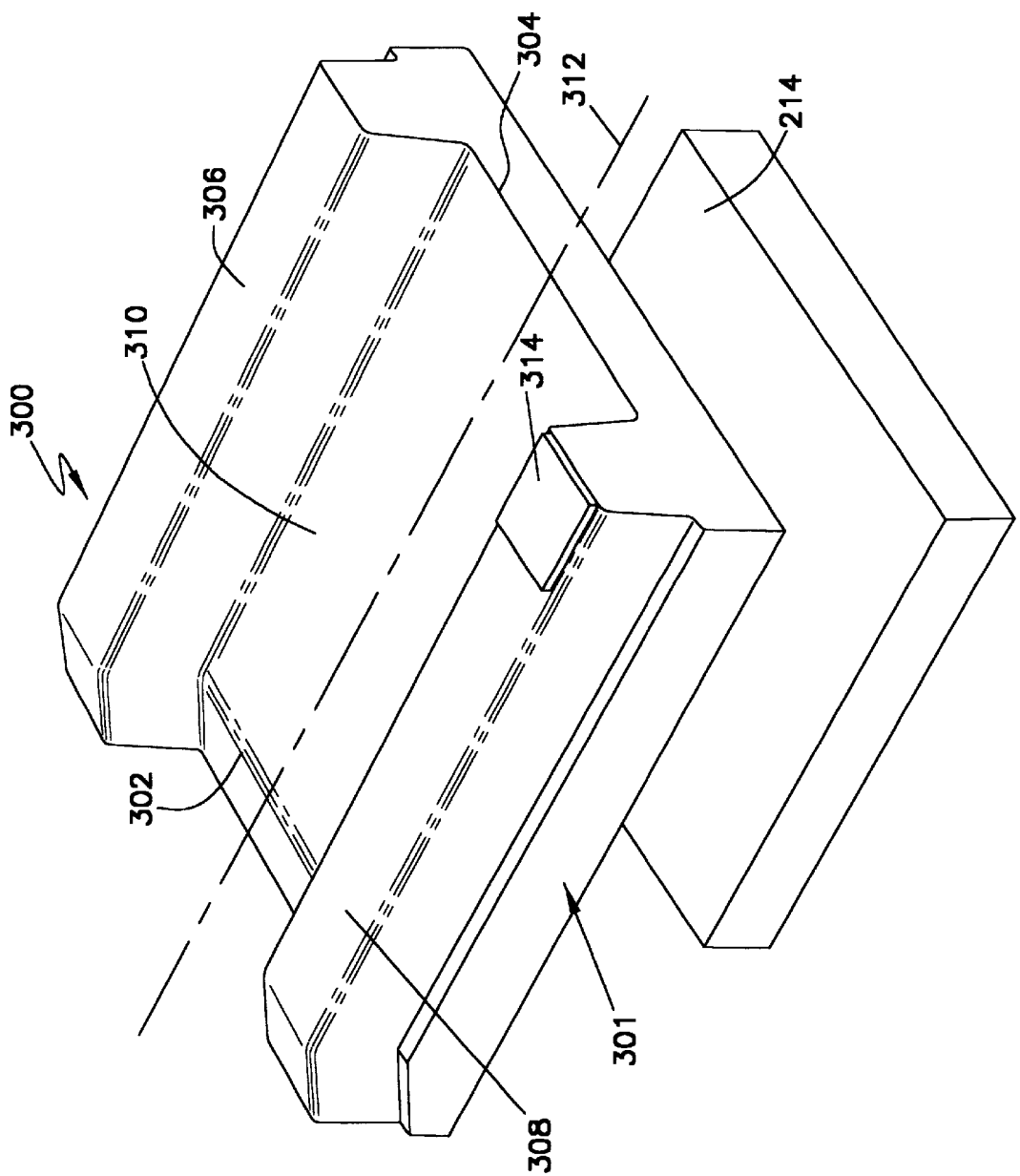
FIG. 3 is a perspective view of a glide slider according to a first embodiment the present invention.

Referring now to FIG. 3, a perspective view of a glide slider 300 in accordance with a first embodiment of the present invention is shown. Glide slider 300 includes glide slider body 301, inside rail 306, outside rail 308, pad 314, and vibration detector 214. Preferably, inside rail 306 and outside rail 308 have dimensions similar to rails of conventional sliders, such as glide slider 200 of FIG. 2. Thus, inside rail 306 and outside rail 308 preferably each have a rail width of about 11 to 12 mils (280 to 305 microns).

Slider body 301 is preferably rectangular and includes leading edge 302, central cavity 310, and trailing edge 304. Together, inside rail 306, outside rail 308, and central cavity 310 create an air bearing surface which generates lift for glide slider 300 enabling it to fly over the surface of a disc. Glide slider 300 flies similarly to conventional sliders in that leading edge 302 generally flies higher than trailing edge 304. The disc opposing face or bottom face of slider 300 is centered along a longitudinal axis 312 which extends between leading edge 302 and trailing edge 314. Inside rail 306 and outside rail 308 are substantially equidistant from longitudinal axis 312.

As can be seen in FIG. 3, pad 314 is included on the bottom surface of outside rail 308 toward trailing edge 304. As mentioned above, glide slider 300 flies above the disc surface in a manner similar to conventional sliders. Thus, when glide slider 300 flies over the disc surface pad 314 is closest to the disc surface. Thus, collisions between glide slider 300 and any asperities on the surface of the disc occur generally at pad 314, thus making outside rail 308 the active rail. In this manner, glide slider 300 can accurately test the outermost portion of the surface of a disc without losing its lift unlike conventional glide slider 200 (FIG. 2).

Pad 314 can be a diamond-like carbon (DLC) pad formed using film forming technology, such as plasma chemical vapor deposition, sputtering, or vacuum metallization. Preferably, pad 314 has a thickness of about 0.4 micro inches. Pad 314 maybe of different shapes and is not limited to the shape shown in FIG. 3. While pad 314 is shown to have a width which is approximately equal to the width of rail 308, pad 314 can be narrower in other embodiments.

Figure 4:
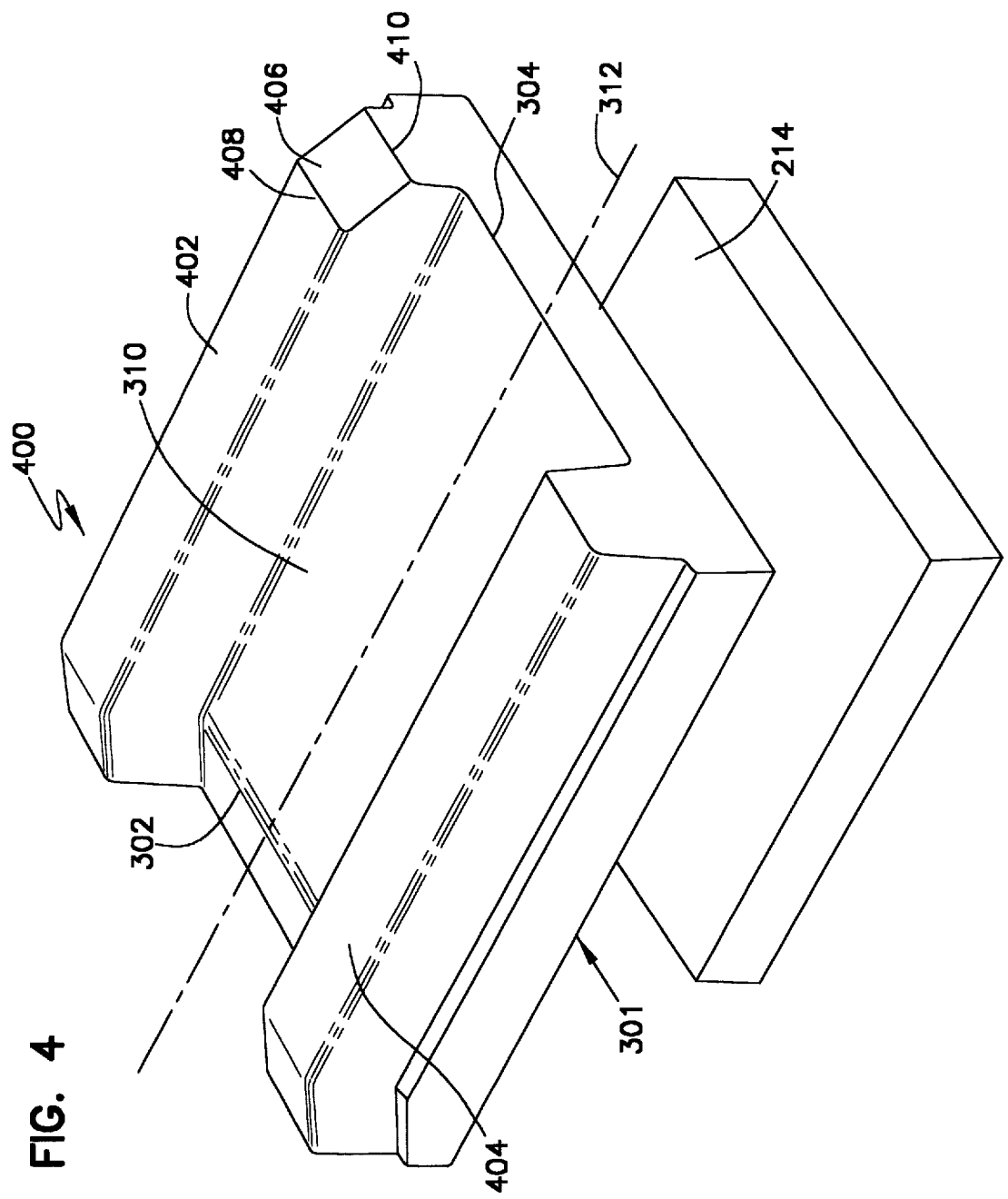
FIG. 4 is a perspective view of a glide slider according to a second embodiment the present invention.

Referring now to FIG. 4, a perspective view of a glide slider 400 in accordance with a second embodiment of the present invention is shown. Inside rail 402 of glide slider 400 includes a ramp or rounding 406 toward trailing edge 304. The bottom surface of outside rail 404 is substantially flat and does not include a ramp or taper at trailing edge 304. Thus, when glide slider 400 flies over the disc surface in a manner similar to conventional sliders, the bottom surface of outside rail 404 is closest to the disc surface at trailing edge 304. Therefore, by employing an inside rail 402 with a ramp 406 toward trailing edge 304, outside rail 404 is made the active rail, thereby making it possible to accurately test the outermost portion of the disc surface without slider 400 losing lift.

In some embodiments, ramp or taper 406 is formed by ion milling inside rail 402 at trailing edge 304. However, taper 406 can be formed using other methods or processes. The length of taper 406 (distance between edges 408 and 410) is about 2 mils in one exemplary embodiment.

Figure 5:
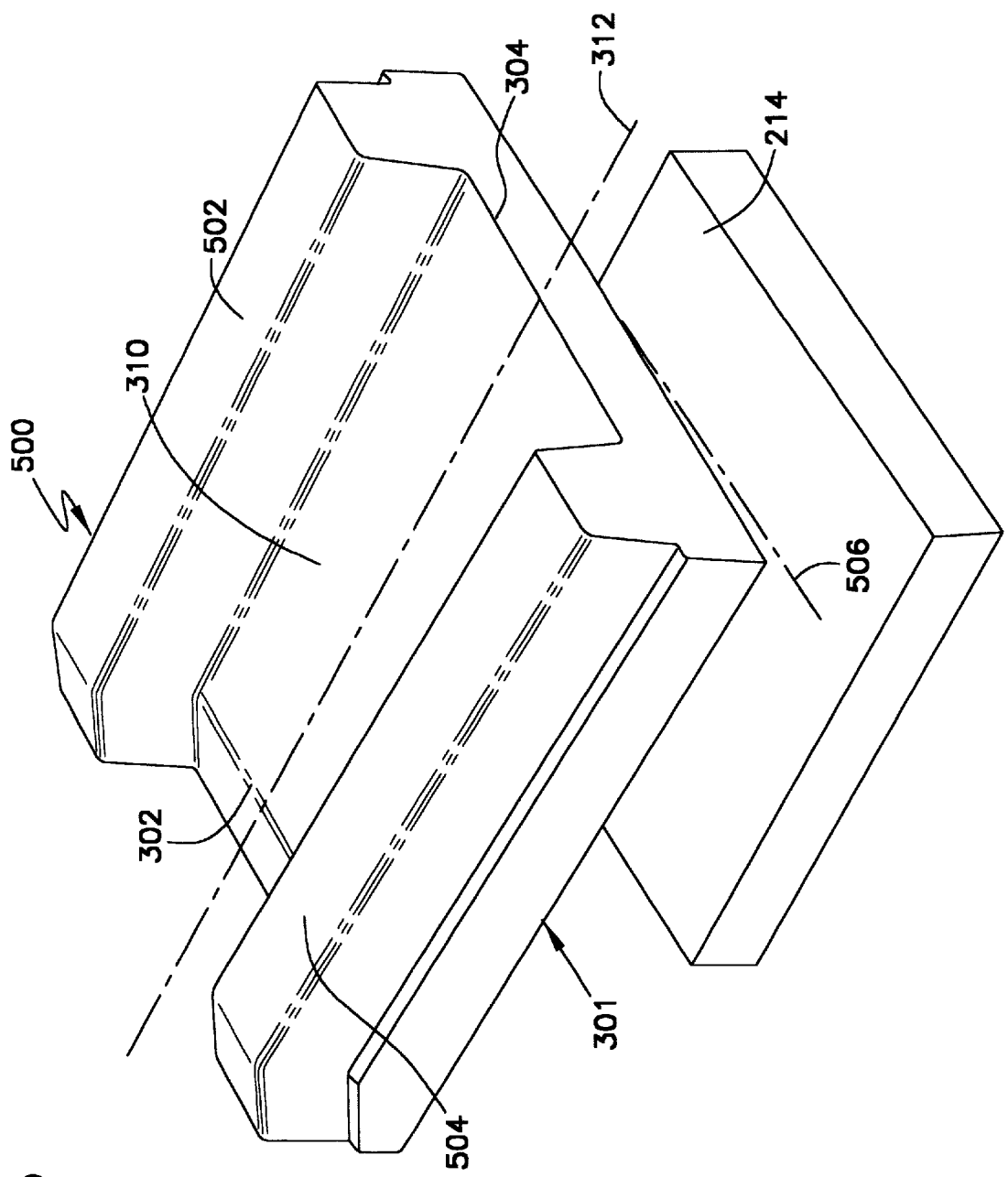
FIG. 5 is a perspective view of a glide slider according to a third embodiment the present invention.
Figure 6:
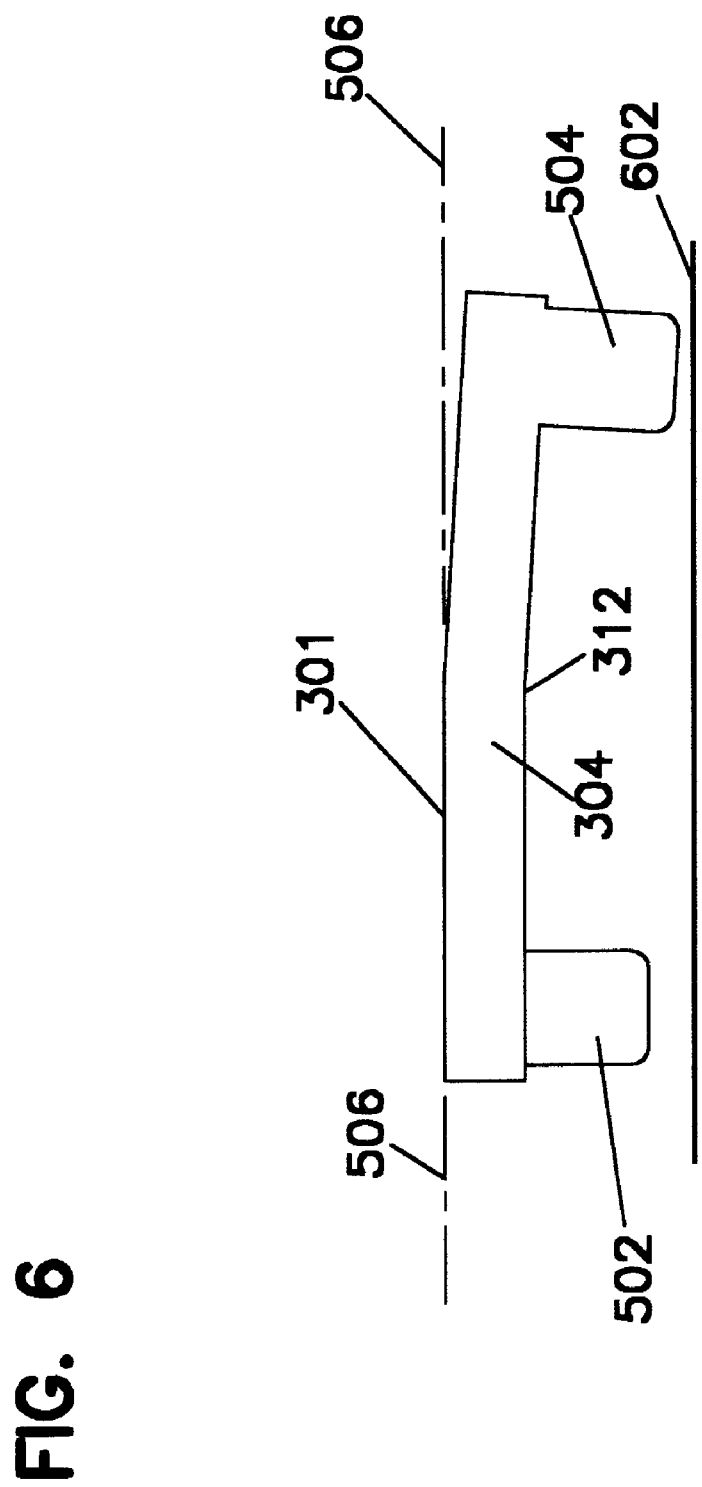
FIG. 6 is an end view of the glide slider embodiment of FIG. 5.

Referring now to FIGS. 5 and 6, a glide slider 500 in accordance with a third embodiment of the present invention is shown. Glide slider 500 is fabricated with a twist which is shown as a deviation from axis 506. As can be seen in FIGS. 5 and 6, the twist (deviation from axis 506) in glide slider 500 is formed such that outside rail 504 is lower than inside rail 502. Thus, when glide slider 500 flies over disc surface 602, the bottom surface of outside rail 504 is closest to the disc surface at trailing edge 304, thereby making the outer rail the active rail. In one exemplary embodiment, the twist is adjusted such that the bottom surface of outside rail 504 is about 0.4 micro-inches lower than the bottom surface of inside rail 502 at trailing edge 304, i.e., the bottom surface of outside rail 504 is about 0.4 micro-inches closer to disc surface 602 (FIG. 6) at trailing edge 304 than the bottom surface of inside rail 502.

Although the above embodiments have been described with reference to a slider that includes two rails of substantially constant width separated by a cavity, known as a "catamaran" slider, the present invention is applicable to other air bearing slider designs, some of which could include more than two rails.

In summary, a glide head for detecting asperities on a disc surface is provided. The glide head includes a glide slider (such as 300, 400, 500) which includes a glide slider body (such as 301) that has a leading edge (such as 302), a trailing edge (such as 304), and a bottom surface therebetween. The bottom surface is centered along a longitudinal axis (such as 312) that extends between the leading and trailing edges. An inside rail (such as 306, 402, 502) is disposed on the bottom surface on a first side of the longitudinal axis (such as 312) and extends from the leading edge (such as 302) to the trailing edge (such as 304). An outside rail (such as 308, 404, 504) is disposed on the bottom surface on a second side of the longitudinal axis (such as 312). The outside rail (such as 312) extends from the leading edge (such as 302) to the trailing edge (such as 304). The inside and outside rails are substantially equidistant from the longitudinal axis (such as 312) at the bottom surface. The outside rail (such as 308, 404, 504) is positioned lower than the inside rail (such as 306, 402, 502) such that a bottom surface of the outside rail (such as 308, 404, 504) extends further from a point on the longitudinal axis (such as 312) on the trailing edge (such as 304) than does a bottom surface of the inside rail (such as 306, 402, 502).

A method for producing a glide head for detecting asperities on a disc is provided. The method includes providing a glide slider (such as 300, 400, 500) that includes a glide slider body (such as 301) having a leading edge (such as 302), a trailing edge (such as 304), and a bottom surface therebetween which is centered along a longitudinal axis (such as 312) that extends between the leading and trailing edges. An inside rail (such as 306, 402, 502) is formed on the bottom surface of the slider body (such as 301) on a first side of the longitudinal axis (such as 312). The inside rail extends from the leading edge (such as 302) to the trailing edge (such as 304). An outside rail (such as 308, 404, 504) is formed on the bottom surface of the slider body (such as 301) on a second side of the longitudinal axis (such as 312). The outside rail (such as 308, 404, 504) extends from the leading edge (such as 302) to the trailing edge (such as 304), the inside and outside rails being substantially equidistant from the longitudinal axis (such as 312) at the bottom surface. The outside rail (such as 308, 404, 504) is formed lower than the inside rail (such as 306, 402, 502) such that a bottom surface of the outside rail (such as 308, 404, 504) extends further from a point on the longitudinal axis (such as 312) on the trailing edge (such as 304) than does a bottom surface of the inside rail (such as 306, 402, 502).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the glide head while maintaining substantially the same functionality without departing from the scope and spirit of the present invention. In addition, although the preferred embodiment described herein is directed to a glide head for the production testing of discs for use in disc drives, it will be appreciated by those skilled in the art that the teachings of the present invention have applications beyond glide testing, and may be used whenever an air bearing slider with an active outside rail is desired, without departing from the scope and spirit of the present invention.

What is claimed is:

1. A head comprising:
    an air bearing slider comprising:
        a slider body having a leading edge, a trailing edge, and a bottom surface therebetween which is centered along a longitudinal axis extending between the leading and trailing edges;
        an inside rail disposed n the bottom surface of the slider body on a first side of the longitudinal axis an extending from the leading edge to the trailing edge; and
        an outside rail disposed n the bottom surface of the slider body on a second side of the longitudinal axis, the outside rail extending from the leading edge to the trailing edge, the inside and outside rails bang substantially equidistant from the longitudinal axis at the bottom surface;
        wherein the outside rail is positioned lower than the inside rail such that a bottom surface of the outside rail extends further from a point on the longitudinal axis on the trailing edge than does a bottom surface of the inside rail, and wherein the slider body include a twist that positions the outside rail lower than the inside rail.

2. The apparatus of claim 1 wherein the twist positions the outside rail bout 0.4 micro-inches lower than the inside rail.

3. A method of forming a head the method comprising:

(a) providing an air bearing slider including a slider body having a leading edge, a trailing edge, and a bottom su face therebetween which is centered along a longitudinal axis that extends between the leading and trailing edges;

(b) forming an inside rail on the bottom surface of the slider body on a first side of the longitudinal axis, the inside rail extending from the leading edge to the trailing edge; and (c) forming an outside rail on the bottom surface of the slider body on a second side of the longitudinal axis, the outside rail extending from the leading edge to the trailing edge, the inside and outside rails being substantially equidistant from the longitudinal axis at the bottom surface;

wherein the outside rail is formed lower than the inside rail such that a bottom surface of the outside rail extends further from a point on the longitudinal axis on the trailing edge than does a bottom surface of the inside rail, and wherein providing the air bearing slider step (a) further includes fabricating the air bearing slider with a twist that positions the outside rail lower than the inside rail.

* * * * *

UNITED STATES PATENT AND TRADEMARK OFFICE
CERTIFICATE OF CORRECTION

PATENT NO. : 6,666,076 B2
DATED : December 23, 2003
INVENTOR(S) : Lin et al.

It is certified that error appears in the above-identified patent and that said Letters Patent is hereby corrected as shown below:

<u>Column 6,</u>
Line 49, after the word "disposed", change "n' to -- on --.
Line 50, change "an" to -- and --.
Line 53, after the word "disposed", change "n" to -- on --.
Line 56, change "bang" to -- being --.
Line 63, change "include" to -- includes --.
Line 67, change "bout" to -- about --.

<u>Column 7,</u>
Lines 3-4, change "su face" to -- surface --.

Signed and Sealed this

Twentieth Day of April, 2004

JON W. DUDAS
*Acting Director of the United States Patent and Trademark Office*